United States Patent
Fine

(10) Patent No.: US 9,438,624 B2
(45) Date of Patent: Sep. 6, 2016

(54) DETECTION OF SIDE CHANNEL ATTACKS BETWEEN VIRTUAL MACHINES

(71) Applicant: Empire Technology Development LLC, Wilmington (DE)

(72) Inventor: Kevin S. Fine, Yverdon-les-Bains (CH)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 130 days.

(21) Appl. No.: 14/384,677

(22) PCT Filed: Dec. 4, 2013

(86) PCT No.: PCT/US2013/073140
§ 371 (c)(1),
(2) Date: Sep. 11, 2014

(87) PCT Pub. No.: WO2015/084344
PCT Pub. Date: Jun. 11, 2015

(65) Prior Publication Data
US 2016/0044059 A1 Feb. 11, 2016

(51) Int. Cl.
*H04L 29/06* (2006.01)
*G06F 21/55* (2013.01)

(52) U.S. Cl.
CPC ......... *H04L 63/1466* (2013.01); *G06F 21/556* (2013.01); *H04L 63/1416* (2013.01); *H04L 63/1425* (2013.01)

(58) Field of Classification Search
CPC ............... H04L 63/14; H04L 63/1408; H04L 63/1416; H04L 63/1425; H04L 63/1466; G06F 21/00; G06F 21/50; G06F 21/52; G06F 21/53; G06F 21/55; G06F 21/552; G06F 21/556; G06F 21/558; G06F 21/56; G06F 21/70; G06F 21/71; G06F 9/45533; G06F 9/45575; G06F 9/45583; G06F 9/45587; G06F 9/45591; G06F 11/484
See application file for complete search history.

(56) References Cited

U.S. PATENT DOCUMENTS

| | | | |
|---|---|---|---|
| 5,761,715 A | 6/1998 | Takahashi | |
| 7,418,733 B2 | 8/2008 | Connary et al. | |
| 8,195,957 B2 | 6/2012 | Dolgunov et al. | |
| 8,359,488 B2 | 1/2013 | Costa | |
| 8,813,240 B1 * | 8/2014 | Northup | G06F 21/554 726/22 |
| 9,009,385 B1 * | 4/2015 | Juels | G06F 3/0622 711/130 |

(Continued)

FOREIGN PATENT DOCUMENTS

| | | |
|---|---|---|
| CN | 102571746 B * | 11/2014 |
| WO | 2013172913 A2 | 11/2013 |

OTHER PUBLICATIONS

"File:Intel Nehalem arch.svg," Accessed at http://web.archive.org/web/20111120050249/http://en.wikipedia.org/wiki/File:lntel_Nehalem_arch.svg, Accessed on Jul. 21, 2014, pp. 5.

(Continued)

*Primary Examiner* — Eric W Shepperd
(74) *Attorney, Agent, or Firm* — Turk IP Law, LLC

(57) ABSTRACT

Technologies are directed to a detector to identify a side channel attack between virtual machines. According to some examples, an inter-processor interrupt (IPI) rate of a first virtual machine (VM), a time stamp counter (TSC) rate of a second VM, and a cache miss ratio (CMR) of a third VM may be monitored. A side channel attack may then be detected based on the IPI rate, the TSC rate, and the CMR.

20 Claims, 8 Drawing Sheets

(56) References Cited

U.S. PATENT DOCUMENTS

| | | | |
|---|---|---|---|
| 9,015,838 B1* | 4/2015 | Northup | G06F 21/554 713/188 |
| 9,209,968 B2* | 12/2015 | Matsuda | H04L 9/005 |
| 2011/0214167 A1 | 9/2011 | Oka | |
| 2011/0214187 A1 | 9/2011 | Wittenstein et al. | |
| 2012/0266221 A1 | 10/2012 | Castelluccia et al. | |
| 2013/0232577 A1 | 9/2013 | Watters et al. | |
| 2013/0297832 A1 | 11/2013 | Ahmad et al. | |
| 2014/0282539 A1* | 9/2014 | Sonnek | G06F 9/45558 718/1 |
| 2014/0359778 A1* | 12/2014 | Kruglick | G06F 9/45558 726/25 |
| 2014/0380037 A1* | 12/2014 | Matsuda | H04L 9/0618 713/150 |
| 2015/0082434 A1* | 3/2015 | Sethumadhavan | G06F 21/556 726/23 |

OTHER PUBLICATIONS

"HV_CPU_Counter enumeration," Accessed at http://web.archive.org/web/20120707024418/http://msdn.microsoft.com/en-us/library/windows/hardware/ff539930(v=vs.85).aspx, Accessed on Jul. 21, 2014, pp. 3.

"Intel® 64 and IA-32 Architectures Software Developer Manuals," Accessed at http://web.archive.org/web/20131111074755/http://www.intel.com/content/www/us/en/processors/architectures-software-developer-manuals.html, Accessed on Jul. 21, 2014, pp. 3.

"Using the RDTSC Instruction for Performance Monitoring," Accessed at http://developer.intel.com/drg/pentiumII/appnotes/RDTSCPM1.HTM, Accessed on Jan. 7, 1998, pp. 1-12.

"Viddler," accessed at http://web.archive.org/web/20131221051343/http://www.viddler.com/v/c830faa3, Feb. 22, 2008, pp. 1-3.

Aciiçmez, O., "Yet Another MicroArchitectural Attack: Exploiting I-cache," Proceedings of the 2007 ACM workshop on Computer security architecture, pp. 11-18 (2007).

Aviram, A. et al. "Determinating timing channels in compute clouds," Proceedings of the 2010 ACM workshop on Cloud computing security workshop. ACM, pp. 103-108 (2010).

Coppens, B. et al., "Practical Mitigations for Timing-Based Side-Channel Attacks on Modern x86 Processors," May 17, 2009, pp. 45-60.

Eddy, "Cloud Computing Growth Hampered by Cost," Accessed at http://www.eweek.com/c/a/Midmarket/Cloud-Computing-Growth-Hampered-by-Cost-Security-Concerns-Survey-482398/, posted on Jul. 22, 2011, pp. 5.

Goodin, D., "Virtual machine used to steal crypto keys from other VM on same server," posted on Nov. 6, 2012, Accessed at http://web.archive.org/web/20131113004324/http://arstechnica.com/security/2012/11/crypto-keys-stolen-from-virtual-machine/, Accessed on Jul. 21, 2014, pp. 3.

Gueron, S., "Intel® Advanced Encryption Standard (AES) New Instructions Set," White Paper, Intel Corporation, pp. 1-94 (2010).

Hu, W.-M., "Reducing timing channels with fuzzy time," In Proceedings of IEEE Security and Privacy ("Oakland"), pp. 8-20, (1991).

International Search Report and Written Opinion in International Patent Application No. PCT/US2013/73140 mailed May 23, 2014.

Ion, L. et al, "Home is safer than the cloud!: privacy concerns for consumer cloud storage," Proceedings of the Seventh Symposium on Usable Privacy and Security, ACM, pp. 20 (2011).

Izu, T. et al., "Improved elliptic curve multiplication methods resistant against side channel attacks," Progress in Cryptology-INDOCRYPT 2002, vol. 2551, pp. 296-313 (2002).

Kim, T. et al., "Stealthmem: system-level protection against cache-based side channel attacks in the cloud," Proceedings of the 21st USENIX conference on Security symposium, USENIX Association, pp. 16, (2012).

Kong, J., et al., "De-constructing new cache designs for thwarting software cache-based side channel attacks," In Proceedings of the 2nd ACM Work-shop on Computer Security Architectures, pp. 25-34 (2008).

Kong, J., et al., "Hardware-software integrated approaches to defend against soft-ware cache-based side channel attacks," In Proceedings of the 15th International Conference on High Performance Computer Architecture, pp. 393-404 (2009).

Köpf, B., et al., "Automatic quantification of cache side-channels," Computer Aided Verification, Springer Berlin/Heidelberg, pp. 564-580 (2012).

McMillan, R., "Researchers find a new way to attack the cloud," Accessed at http://www.computerworld.com/s/article/9137507/Researchers_find_a_new_way_to_attack_the_cloud, posted on Sep. 3, 2009 pp. 3.

Muller, T., et al., "AESSE: a cold-boot resistant implementation of AES," In Proceedings of the Third European Workshop on System Security, pp. 42-47 (2010).

Osvik, D. et al., "Cache attacks and countermeasures: the case of AES," Topics in Cryptology—CT-RSA 2006, pp. 1-20 (2006).

Percival, C., "Cache missing for fun and profit," Presented at BSDCan 2005, May 2005, pp. 13.

Ristenpart, T., et al., "Hey, you, get off of my cloud! Exploring information leakage in third-party compute clouds," Proceedings of CCS 2009, pp. 199-212 (2009).

Tromer, E. et al., "Efficient cache attacks on AES, and countermeasures," Journal of Cryptology, vol. 23, No. 2, pp. 37-71 (2009).

Vattikonda, B. et. al., "Eliminating fine grained timers in Xen," CCSW '11 Proceedings of the 3rd ACM workshop on Cloud computing security workshop, pp. 41-46 (2011).

Voellm, T., "Hyper-V Performance Counters—Part three of many—"Hyper-V Hypervisor Logical Processors" counter set," posted on May 9, 2008, Accessed at http://web.archive.org/web/20130519074855/http://blogs.msdn.com/b/tvoellm/archive/2008/05/09/hyper-v-performance-counters-part-three-of-many-hyper-v-logical-processors-counter-set.aspx, Accessed on Jul. 21, 2014, pp. 2.

Wang, Z., and Lee, R. B., "New cache designs for thwarting software cache-based side channel attacks," In Proceedings of the 34th International Symposium on Computer Architecture, vol. 35, No. 2, pp. 494-505 (2007).

West, R. et al., "Online cache modeling for commodity multicore processors," ACM SIGOPS Operating Systems Review, vol. 44, No. 4 pp. 19-29 (2010).

Zhang, Y. et al, "Cross-VM side channels and their use to extract private keys," Proceedings of the 2012 ACM conference on Computer and communications security. ACM, pp. 305-316 (2012).

Zhou, M. et al., "Security and Privacy in Cloud Computing: A Survey," In 2010 Sixth International Conference on Semantics Knowledge and Grid (SKG), pp. 105-112, Nov. 2010.

Brockmeier, J.Z., "Containers vs. Hypervisors: Choosing the Best Virtualization Technology," accessed at https://web.archive.org/web/20101201113559/http://www.linux.com/news/technology-feature/virtualization/300057:containers-vs-hypervisors-choosing-the-best-virtualization-technology-, Apr. 13, 2010, pp. 3.

\* cited by examiner

DETECTION OF SIDE CHANNEL ATTACKS BETWEEN VIRTUAL MACHINES

CROSS-REFERENCE TO RELATED APPLICATION

This Application is the National Stage filing under 35 U.S.C. §371 of PCT Application Ser. No. PCT/US13/73140 filed on Dec. 4, 2013. The PCT application is hereby incorporated by reference in its entirety.

BACKGROUND

Unless otherwise indicated herein, the materials described in this section are not prior art to the claims in this application and are not admitted to be prior art by inclusion in this section.

A cloud infrastructure provider may leverage economies of scale to provide dynamic and on-demand computing resources at lower cost. Virtualization is one of the tools that may be utilized by an infrastructure provider to increase efficiency and enhance performance. Virtual machines (VMs) from multiple customers may share physical resources such as servers. Shared resources may lead to multiple mutually distrusting customers simultaneously sharing physical resources from the same provider. Customers may be aware of the shared nature of cloud infrastructure. One obstacle preventing customers from migrating to cloud computing is the fear of spying from other users.

SUMMARY

The present disclosure generally describes techniques to operate a detector to identify side channel attacks between virtual machines.

According to some examples, a method is provided to detect a side channel attack between virtual machines. The method may include monitoring an inter-processor interrupt (IPI) rate of a first virtual machine (VM), monitoring a time stamp counter (TSC) rate of a second VM, monitoring a cache miss ratio (CMR) of a third VM, and detecting the side channel attack based on the IPI rate, the TSC rate, and the CMR.

According to other examples, a computing device may be provided to detect a side channel attack between virtual machines. The computing device may include a memory configured to store instructions, a controller coupled to the memory, where the controller executes a side channel attack detection module. The side channel attack detection module may be configured to monitor an inter-processor interrupt (IPI) rate of a first virtual machine (VM), detect the IPI rate to exceed a predetermined IPI rate threshold, label the first VM as at least one from a set of: an accomplice candidate and a bystander candidate, monitor a cache miss ratio (CMR) of a third VM, detect the CMR to exceed a predetermined CMR threshold, and label the third VM as a victim candidate.

According to other examples, a computer-readable medium may be provided to detect a side channel attack between virtual machines. The instructions may cause a method to be performed in response to execution, the method being similar to the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
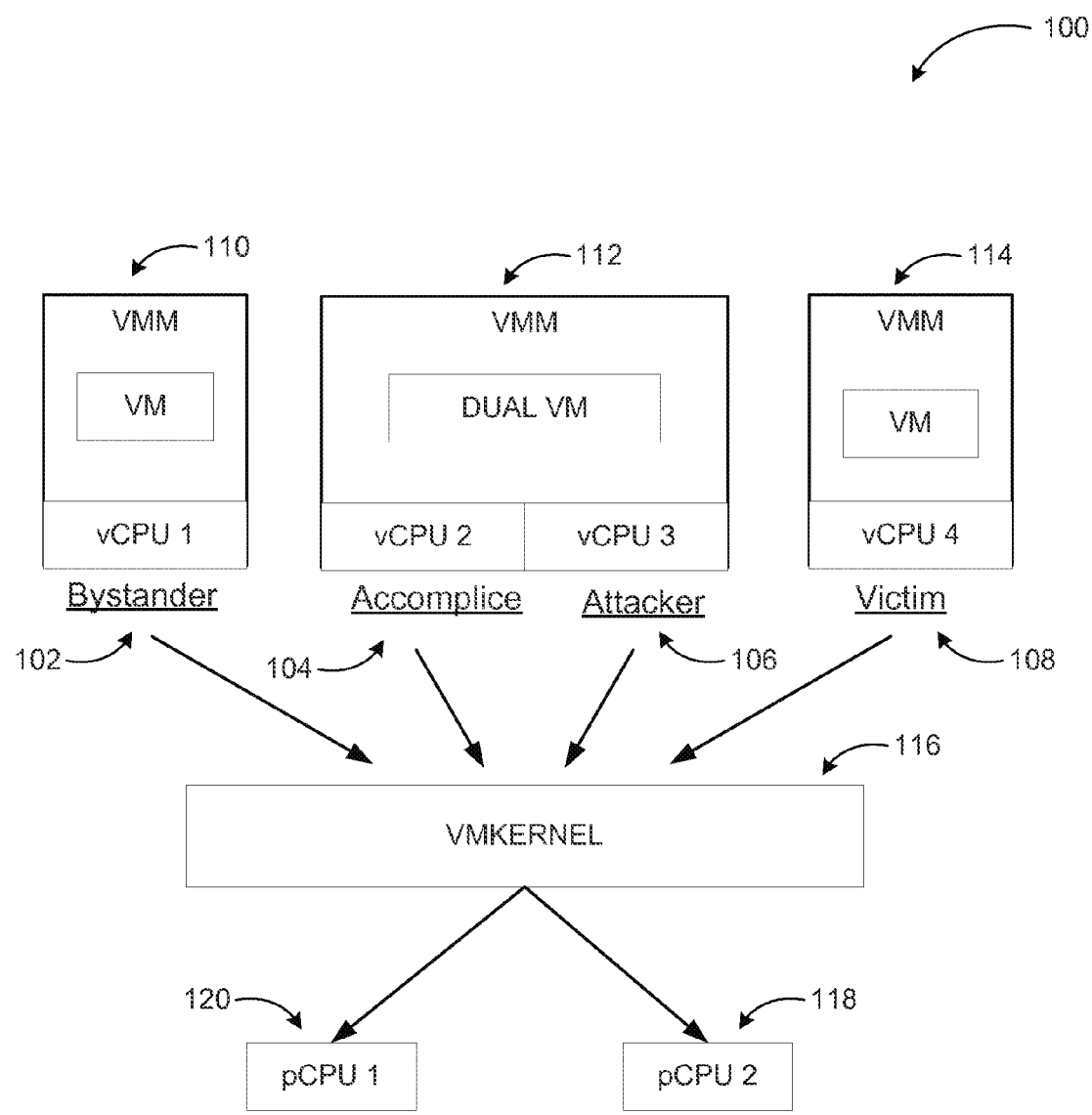
FIG. 1 illustrates an example schema of virtual machines in an environment with side channel attacks.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to operation of a detector to identify a side channel attack between virtual machines.

Briefly stated, technologies are directed to a detector to identify a side channel attack between virtual machines. According to sonic examples, an inter-processor interrupt (IPI) rate of a first virtual machine (VM), a time stamp counter (TSC) rate of a second VM, and a cache miss ratio (CMR) of a third VM may be monitored. A side channel attack may then be detected based on the IPI rate, the TSC rate, and the CMR.

FIG. 1 illustrates an example schema of virtual machines in an environment with side channel attacks, arranged in accordance with at least some embodiments described herein.

As shown in a diagram 100, a virtual machine kernel (vmKernel) 116 may manage multiple virtual machine managers (VMMs) 110, 112, and 114. A virtual machine may be a self-contained execution environment for applications and services. A virtual machine may execute high-level applications such as operating systems. A VMM may manage and monitor a VM and provide resources to allow the VM to execute. The VMM 110 may provide a virtual central processing unit (vCPU) 1 to execute operations associated with a VM. A vCPU may be a processor placeholder such as a thread. Each VM may be assigned a vCPU, which in turn may be assigned to a processor to execute operations associated with a VM. Alternatively, a VM and a vCPU may be synonymous terms used to describe a self-contained execution environment.

In an alternative example, the VMM 112 may manage dual VMs. The dual VMs may be assigned to a vCPU 2 and a vCPU 3. The VMM 114 may manage another VM assigned to a vCPU 4. The vmKernel 116 may manage execution of instructions from the vCPU 1, the vCPU 2, the vCPU 3, and the vCPU 4 by allocating physical resources such as a physical CPU (pCPU) 1 (120) and a pCPU 2 (118) to execute the instructions.

An attacker 106 sending instructions through the vCPU 3 may take advantage of shared resources with a victim 108 to execute a side channel attack to capture instructions executed by the victim 108. The attacker 106 may use an accomplice 104 during the side channel attack. The accomplice 104 may issue IPIs to the attacker 106 to enable the attacker 106 to interrupt execution of instructions by the victim 108. A bystander 102 may or may not take pad in the side channel attack. The bystander 102 may include the VMM 110 that may execute instructions before or after those instructions are executed by the victim 108 on one of the shared resources such as the pCPU 1 (120) or the pCPU 2 (118).

The attacker 106 may take advantage of commonly used code base of an application to execute a side channel attack. Commonly used code base may include open source code elements or libraries used to construct applications. The attacker 106 may determine a path followed by an application executing in a commonly used processor between the victim 108 and the attacker 106 such as the pCPU 1 (120) or the pCPU 2 (118). Knowledge of the path may be used to determine data input or output of the application (executed by the victim 108) such as secret keys.

The execution path may be determined by examining the instructions of the victim 108 loaded into an L1 instruction cache of a commonly used processor. The attacker 106 may use a prime probe attack protocol to examine the L1 instruction cache or an instruction cache (I-cache), for example. The attacker 106 using the prime probe attack protocol may completely load I-cache with dummy instructions (that is, imitation instructions). Next, the attacker 106 may allow the victim 108 to execute a few instructions using the I-cache. Followed by the attacker continuing to load the I-cache with dummy instructions. While continuing to load the I-cache, the attacker 106 may measure a time it takes to load each dummy instruction into the I-cache. The attacker 106 may measure the time it takes to load the I-cache using a read time stamp counter (rdtsc) instruction. The rdtsc instruction may read the time stamp counter (TSC). The TSC is a counter (for example, 64-bit) on a processor, which counts a total number of clock cycles since a reset. A variance in a returned value before and after execution of the rdtsc instruction may determine a time of instruction consumption. If the attacker 106 loads a previously evicted cache location, the time of instruction consumption may be a large value. The attacker 106 may be aware that the cache location was used for an executed instruction by the victim 108.

A direct relationship between the cache location and a system memory location may not be discernable. However, a cache is set-associative. That is, a location within the cache of instructions associated with an executed application may correspond only to a subset of locations within the system memory associated with the executed application. Therefore, monitoring used cache locations may allow the attacker 106 to determine the execution path of the victim 108.

In multiple VM environments, the attacker 106 may use an observation granularity, an observation noise, and a vCPU migration to execute the side channel attack. The observation granularity may encapsulate an observation period by the attacker 106. In an example scenario, a vmKernel may allow the victim 108 to execute instructions during a predetermined period of time. In some examples, a number of executed instructions by the victim 108 may be a relatively large number, which may prevent analysis of the instructions by the attacker 106. For example, if the process runs uninterrupted for 30 milliseconds while executing 3 billion instructions per second a total of approximately 90 million instructions may be executed. This may be much larger than the instruction cache implying that the instruction cache is overwritten multiple times, preventing analysis by the attacker. The attacker 106 may interrupt the execution of instructions by the victim 108 to lower the observation granularity. The attacker 106 may use IPIs to interrupt execution of instructions by the victim 108. The attacker 106 may also use a second attacker process such as the accomplice 104. An example of the second attacker process may include the accomplice 104 configured to execute an iteration that issues IPIs to the attacker 106. The iteration may prompt the vmKernel to instigate the attacker to manage the IPI and prevent execution by the victim 108. The victim 108's execution time may be shortened because the attacker 106 may interrupt an executed application by the victim 108 to manage the IPI. Shortened execution time of the victim 108 may allow the attacker 106 to trace the execution path of the victim 108's executed application.

The observation noise may encapsulate noise associated with manual analysis of the victim 108's instructions. In an example scenario, the attacker 106 may determine a measurement time of an execution by the victim 108 to include the observation noise that inhibits an analysis of the victim 108's instructions. The attacker 106 may use a machine learning algorithm that includes a support vector machine (SVM) based on a hidden Markov model (HMM) to overcome the observation noise, for example. The attacker 106 may infer executed operation with few errors using the machine learning algorithm.

The vCPU migration may encapsulate physical resource sharing. In an example scenario, the attacker may share the pCPU 1 (120) with the victim 108. Alternatively, the attacker 106 may not share the pCPU 1 (120). The attacker 106 may aggregate code fragment sequences associated with the victim 108 using the machine learning algorithm that includes the SVM and the HMM to determine time measurements associated with the victim 108.

FTC. 2 illustrates an example of a side channel attack between virtual machines, arranged in accordance with at least some embodiments described herein.

As shown in a diagram 200, a vmKernel may use a timeshare scheme to execute instructions by vCPUs 208 of VMMs on a pCPU 1 (204) and a pCPU 2 (206) through a time 202. A bystander may execute operations initially on the pCPU 1 (204). During the period of time in which the bystander executes instructions on the pCPU 1 (204), an attacker and a victim may execute instructions on the pCPU 2 (206). The attacker may be unable to interrupt the victim's execution of instructions during a period of time in which the bystander executes instructions on the pCPU 1 (204). Next, an accomplice may allow the attacker to monitor the executed instructions of the victim by interrupting an execution by the victim. Interrupted execution periods on the pCPU 2 (206) may allow the attacker to monitor an execution path of instructions by the victim through monitoring of instructions of cache of pCPU 2 (206) shared with the victim.

The accomplice may aid the attacker by transmitting an inter-processor interrupt 210 to allow the attacker to execute an instruction on the pCPU 2 (206) and interrupt the execution of instructions by the victim. During a period such as a timing attack 212, the accomplice may send multiple IPIs to the attacker to interrupt execution of instructions by the victim on the pCPU 2 (206). The attacker may be allowed to perform a prime probe attack to monitor the instructions executed by the victim in an iterative process. The iterative process may continue until the accomplice is replaced by the bystander at the pCPU 1 (204). During the timing attack 212 period, the attacker may record a timing data for analysis of the cache of pCPU 2 (206) shared with the victim.

Figure 3:
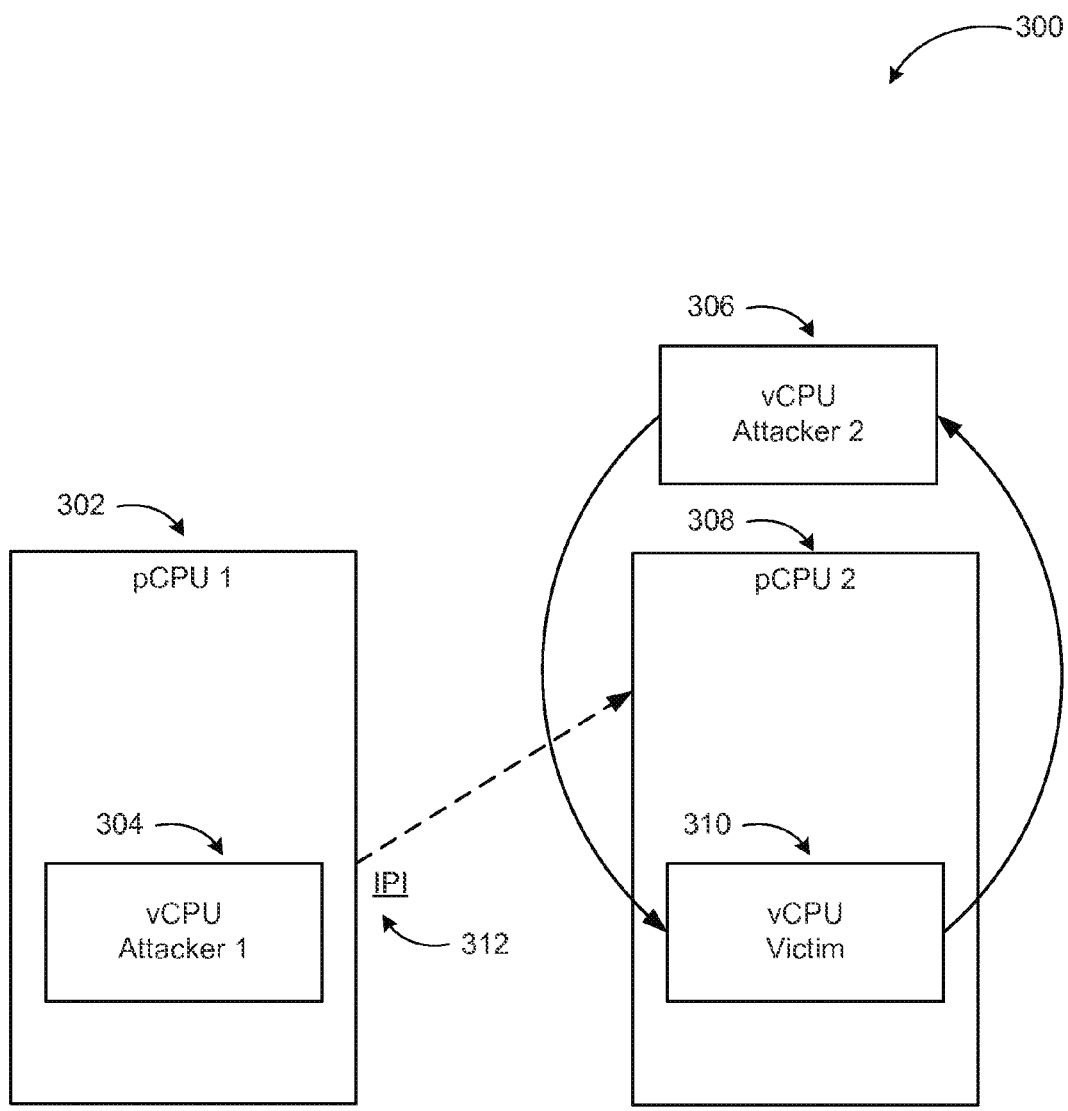
FIG. 3 illustrates another example of a side channel attack between virtual machines.

FIG. 3 illustrates another example of a side channel attack between virtual machines, arranged in accordance with at least some embodiments described herein.

A diagram 300 shows components of a side channel attack. Three vCPUs may be involved in the side channel attack in a datacenter hosting VMs. The vCPUs may execute instructions on a pCPU 1 (302) and a pCPU 2 (308). An attacker 1 (304) may issue IPIs 312 to the pCPU 2 (308). The attacker 1 (304) may be an accomplice. An attacker 2 (306) may execute rdtsc instructions to the pCPU 2 (308). Next, the attacker 2 (306) may be allowed to change places with a victim 310 to execute instructions on the pCPU 2 (308). The attacker 2 (306) may monitor cache of pCPU 2 (308) to determine executed instructions by the victim 310 stored in the cache during a period of interruption as a result of IPIs issued by the attacker 1 (304). The victim 310 may have L1 cache or 1-cache misses because of the IPIs 312 interrupting execution of instructions by the victim 310.

Each action, described above, may occur separately during normal operations at a datacenter. However, the actions occurring together may be an indicator of the side channel attack. Prevention of the side channel attack may be accomplished by a detector which correlates commonly used metrics between multiple vCPUs to spot behavior that signals a cross VM timing attack.

Figure 4:
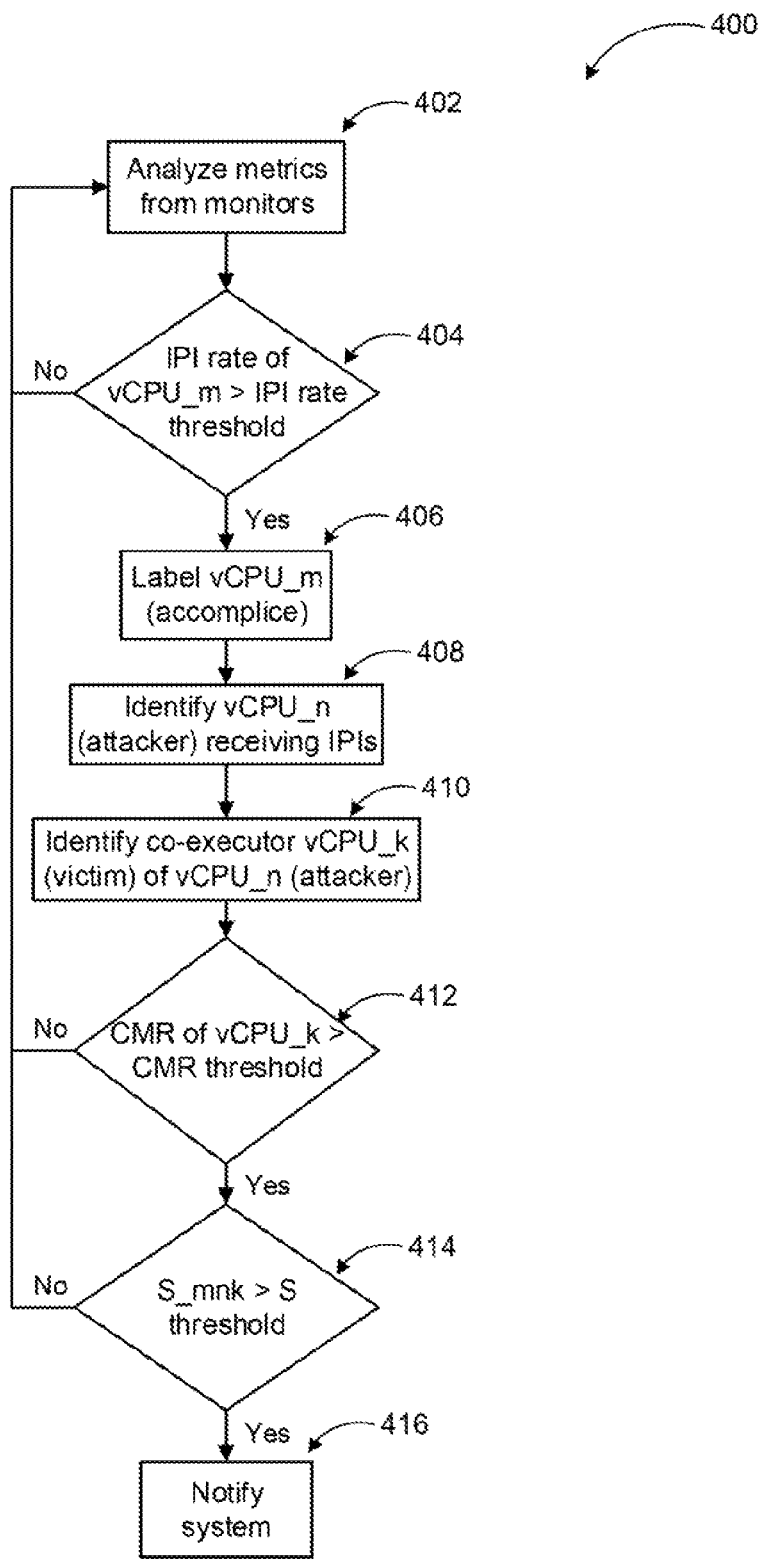
FIG. 4 illustrates an example flow diagram of operating a detector to identify a side channel attack between virtual machines.

FIG. 4 illustrates an example flow diagram of operating a detector to identify a side channel attack between virtual machines, arranged in accordance with at least some embodiments described herein.

As shown in a diagram 400, detection of a side channel attack may involve a number of operations. A detector may analyze metrics from monitors monitoring vCPUs executing instructions on pCPUs through a vmKernel at operation 402 (ANALYZE METRICS FROM MONITORS). The metrics may include an IPI rate, a TSC rate, and a CMR. The IPI rate of a vCPU_m (that is, a first VM) may be compared to a predetermined IPI rate threshold at operation 404 (IS IPI RATE OF Vcpu_m GREATER THAN IPI RATE THRESHOLD?). The IPI rate threshold may be determined by a dynamic system setting that is adjustable based on a number of parameters associated with the vmKernel, a pCPU, a vCPU, a VM, or a VMM. Alternatively, the IPI rate threshold may be set manually by an external or an internal source such as the datacenter. In response to determining the IPI rate of the vCPU_m to be higher than the IPI rate threshold, the vCPU_m may be labeled an accomplice at operation 406 (LABEL vCPU_m ACCOMPLICE). The vCPU_m may be part of an attacker pair.

Next, a vCPU_n (that is, a second VM) the IPIs from the vCPU_m may be identified as an attacker at operation 408 (IDENTIFY vCPU_n ATTACKER RECEIVING IPIs). The vCPU_n may be interrupted by the vCPU_m. The vCPU_n may be the other part of the attacker pair. The interrupted vCPU_n may be allowed to execute on a pCPU used by a co-executor vCPU_k (that is, a third VM).

Execution of instructions such as an RDTSC by the vCPU_n on the pCPU array interrupt execution of instructions by the co-executor vCPU_k. The co-executor vCPU_k may be identified as a victim at operation 410 (IDENTIFY CO-EXECUTOR vCPU_k VICTIM OF vCPU_n ATTACKER).

A CMR of the vCPU_k may be compared to a CMR threshold at operation 412 (IS CMR OF vCPU_k GREATER THAN CMR THRESHOLD?). The CMR may be a number of cache misses divided by a total cache access associated with a vCPU (or a VM). Caches may be designed to keep the CMR close to zero. A prime probe attack may force the vCPU_k to have the CMR near a value of one. A vCPU with a high CMR near to the value of one may further be examined to determine the side channel attack. The CMR threshold may be determined by a dynamic system setting adjustable based on number of parameters associated with the vmKernel, the pCPU, the vCPU, the VM, or the VMM. Alternatively, the CMR threshold may be set manually by an external or an internal source such as the datacenter. In response to determining the CMR higher than the CMR threshold, a suspicion value or an S_mnk associated with the side channel attack based on the three vCPUs may be computed.

The S_mnk may be computed based on the rate of the vCPU_m, a TSC rate of the vCRU_n, and the CMR of the vCPU_k. The computed the S_mnk may be compared to a suspicion value threshold at operation 414 (IS S_mnk GREATER THAN S THRESHOLD?). The suspicion value threshold may be determined by a dynamic system setting adjustable based on a number of parameters associated with the vmKernel, the pCPU, the vCPU, the VM, or the VMM. Alternatively, the suspicion value threshold may be set manually by an external or an internal source such as the datacenter. In response to determining the suspicion value S_mnk higher than the suspicion value threshold, a system, such as a datacenter management, may be notified of the side channel attack associated with the vCPU_m, the vCPU_n, and the vCPU_k at operation 416 (NOTIFY SYSTEM).

In some examples, the S_mnk may be computed using a formula of $S\_mnk=\alpha*(IPI\ rate\ of\ vCPU\_m/IPI\ rate\ threshold)+\beta*(TSC\ rate\ of\ vCPU\_n/TSC\ rate\ threshold)+\gamma*(CMR\ of\ vCPU\_k/CMR\ threshold)$. The formula may heuristically increase the suspicion value of the S_mnk in response to an increase in a suspicious behavior. The factors $\alpha$, $\beta$, and $\gamma$ may be included to allow datacenters to configure or adjust the formula to compute the S_mnk to a real world behavior. A default value for each of $\alpha$, $\beta$, and $\gamma$ may be 1.0, for example.

In response to determining the S_mnk value higher than the suspicion threshold, the vCPU_m and the vCPU_n may be identified as attackers (or the attacker pair). Next, an event identifying the vCPUs as the attackers may be recorded in a data store. The event may be generated by clustering the IPI rate, the TSC rate, the CMR and data associated with the vCPU_m, the vCPU_n, and the vCPU_k into the event. To prevent the attack, the vCPU_n may be forced to execute alone on the pCPU. In addition to $\alpha$, $\beta$, and $\gamma$, the IPI rate threshold, the TSC rate threshold, the CMR threshold, and the suspicion threshold may be configured by the datacenter in some examples.

According to some embodiments, CMR of an L1 data cache may also be monitored instead of CMR of an L1 instruction cache (L1i). Side channel attacks on the L1 data cache may be similarly likely as on the L1i. The side channel attack on an L2 and an L3 cache may be unlikely because of increased size of the L2 and the L3 cache, mixed instructions in the L2 and L3 cache, and increased distance of the L2 and the L3 cache from the pCPU.

Other interrupts may also be monitored because the accomplice VM may use alternate interrupts including input/output (I/O) interrupts to interrupt the attacker VM and force the victim VM to stop executing instructions. A detector monitoring and analyzing interrupts to detect the side channel attack may monitor IPIs as well as other interrupts.

According to other embodiments, the attacker may use an instruction other than rdtsc to time events. In an example scenario where the attacker may use a different instruction to time events, the detector may monitor CMR associated with the victim and the IPI rate associated with the accomplice to determine the side channel attack. The CMR above the CMR threshold and the IPI rate above the IPI rate threshold may indicate the side channel attack.

Figure 5:
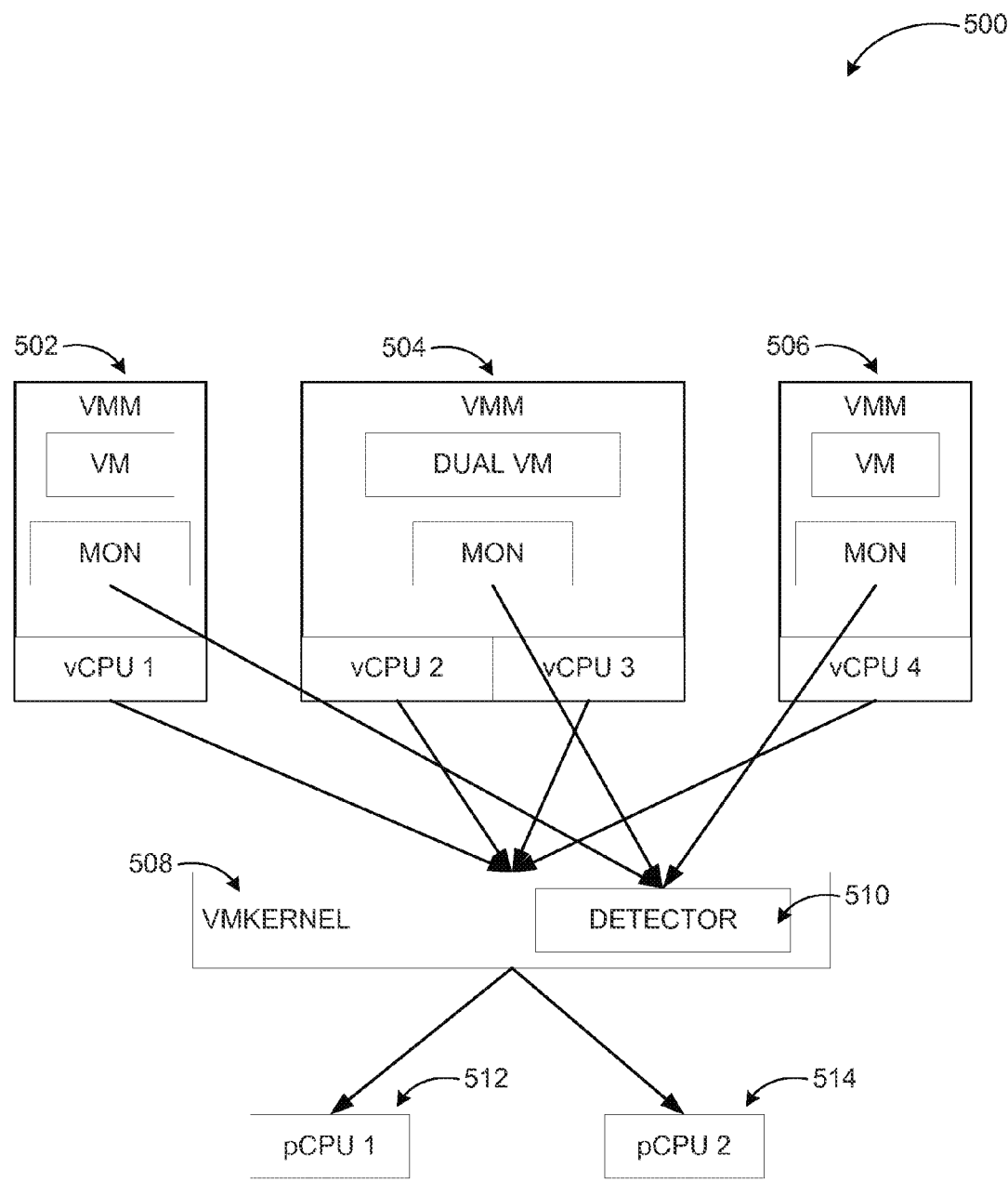
FIG. 5 illustrates an example of a detector used to detect a side channel attack between virtual machines.

FIG. 5 illustrates an example of a detector used to detect a side channel attack between virtual machines, arranged in accordance with at least some embodiments described herein.

As shown in a diagram 500, a bystander vCPU 1 may be managed by a VMM 502, an accomplice vCPU 2 and an attacker vCPU 3 may be managed by a VMM 504, and a victim vCPU 4 may be managed by a VMM 506. A vmKernel 508 may allocate resources to allow vCPUs 1, 2, 3, and 4 to execute instructions. The vmKernel 508 may manage the resources pCPU 1 (512) and pCPU 2 (514).

The vmKernel 508 may host a detector 510 analyzing metrics transmitted from monitors in the VMMs 502, 504, and 506. The monitors may monitor metrics including an IPI rate, a TSC rate, and a CMR associated with the vCPU 1, the vCPU 2, the vCPU 3, and the vCPU 4. The detector may analyze the IPI rate, the TSC rate, and the CMR to determine a suspicion value associated with the vCPU 2, the vCPU 3, and the vCPU 4. The suspicion value may be compared to a suspicion value threshold to identify the vCPU 2 and the vCPU 3 as an attacker pair.

Figure 6:
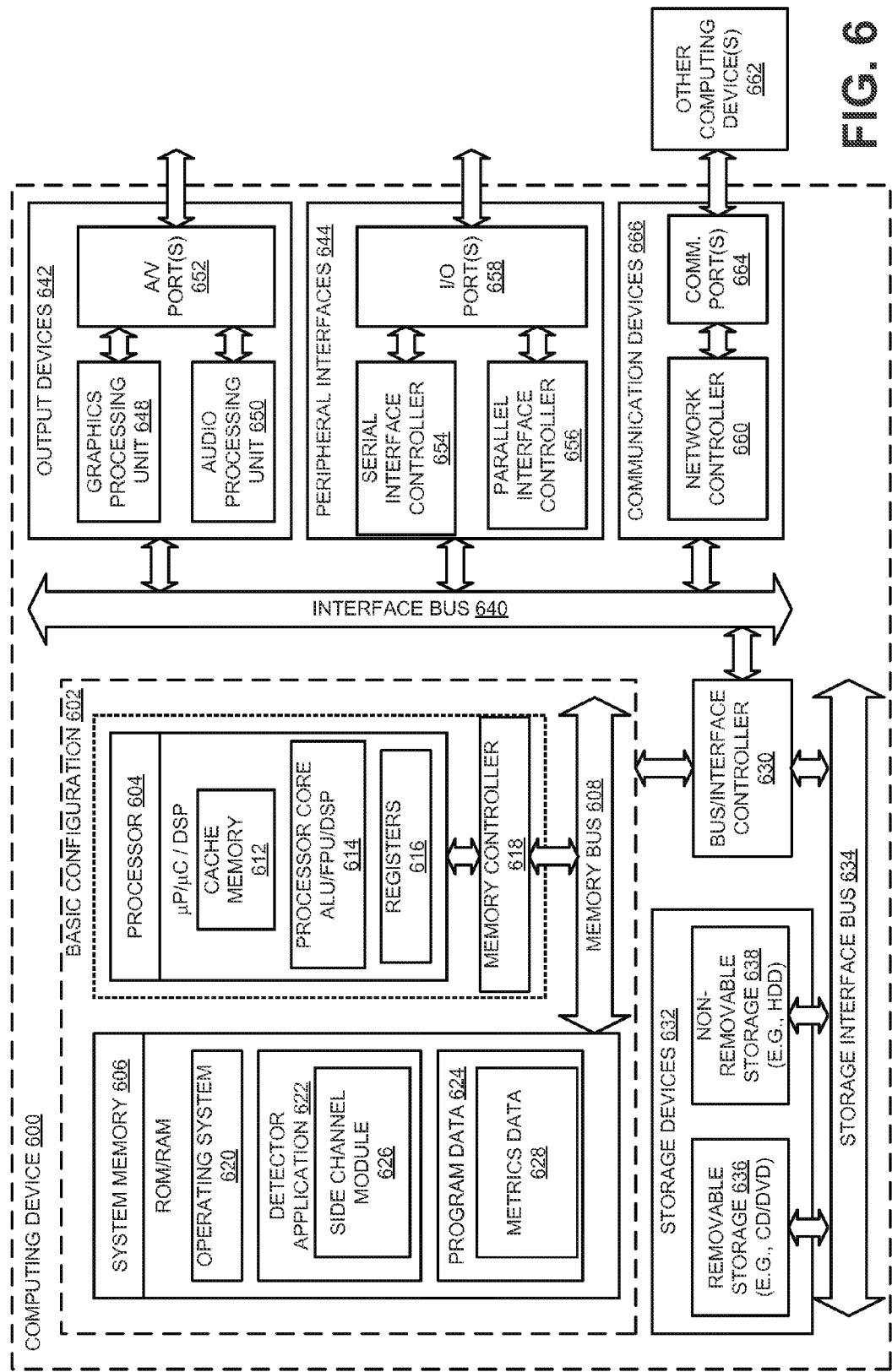
FIG. 6 illustrates a general purpose computing device, which may be used to operate a detector to identify a side channel attack between virtual machines.

FIG. 6 illustrates a general purpose computing device, which may be used to operate a detector to identify a side channel attack between virtual machines, arranged in accordance with at least some embodiments described herein. The computing device 600 of the FIG. 6 may be one or more of the vmKernel 508 executed by a datacenter, or some other device that is not shown in FIGS. 1, 2, 3, 4, and 5. In a basic configuration 602, computing device 600 typically includes one or more processors 604 and a system memory 606. A memory bus 608 may be used for communicating between processor 604 and system memory 606.

Depending on a particular configuration, processor 604 may be of any type including but not limited to a microprocessor ($\mu$P), a microcontroller ($\mu$C), a Digital Signal Processor (DSP), or any combination thereof. Processor 604 may include one more levels of caching, such as a cache memory 612, a processor core 614, and registers 616. Example processor core 614 may include an Arithmetic Logic Unit (ALU), a floating point unit (FPU), a Digital Signal Processing core (DSP Core), or any combination thereof. An example memory controller 618 may also be used with processor 604, or in some implementations, memory controller 618 may be an internal part of processor 604.

Depending on the particular configuration, system memory 606 may be of any type including but not limited to volatile memory such as RAM), non-volatile memory (such as ROM, flash memory, etc. or any combination thereof. System memory 606 may include an operating system 620, a detector application 622, and program data 624. The detector application 622 may include a side channel module 626 that is arranged to detect a side a channel attack between VMs (or vCPUs). Program data 624 may include one or more of metrics data 628 and similar data as discussed above in conjunction with at least FIGS. 1, 2, 3, 4, and 5. This data may be useful for detecting the side channel attack between VMs as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and Hard-Disk Drives (HDDs), optical disk drives such as Compact Disk (CD) drives or Digital Versatile Disk (DVD) drives, Solid State Drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store information and which may be accessed by computing device 600. Any such computer storage media may be part of computing device 600.

Computing device 600 may also include an interface bus 640 for facilitating communication from various interface devices (for example, output devices 642, peripheral interfaces 644, and communication devices 666) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 666 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a physical server, virtual server, a computing cloud, or a hybrid device that include any of the above functions. Computing device 600 may also be implemented as a personal computer including both laptop computer and non-laptop computer configurations. Moreover, computing device 600 may be implemented as a networked system or as part of a general purpose or specialized server.

Networks for a networked system including computing device 600 may comprise any topology of servers, clients, switches, routers, modems, Internet service providers, and any appropriate communication media (for example, wired or wireless communications). A system according to embodiments may have a static or dynamic network topology. The networks may include a secure network such as an enterprise network (for example, a LAN, WAN, or WLAN), an unsecure network such as a wireless open network (for example, IEEE 802.11 wireless networks), or a world-wide network such (for example, the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 7:
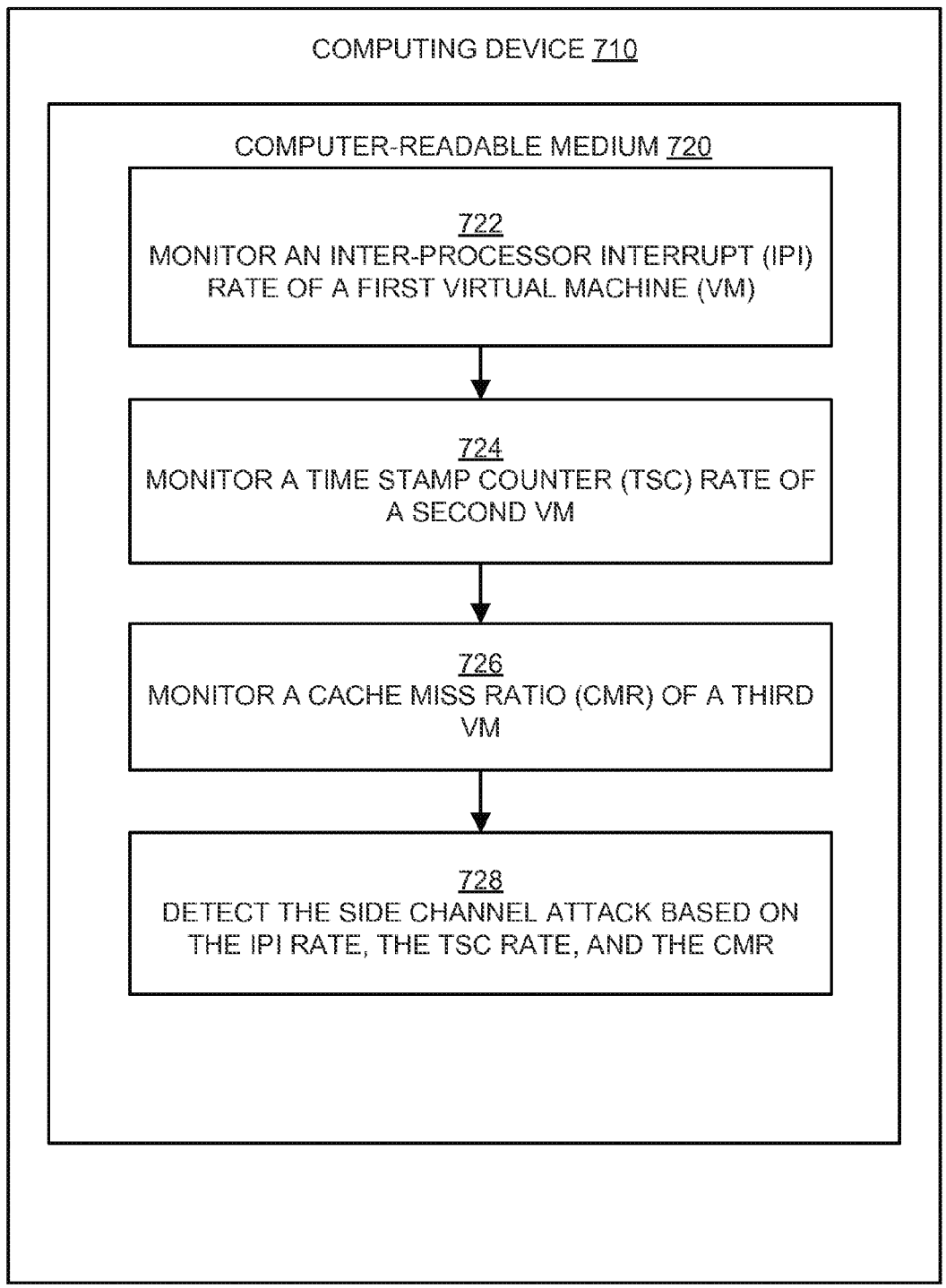
FIG. 7 is a flow diagram illustrating an example method to operation a detector to identify a side channel attack between virtual machines.

FIG. 7 is a flow diagram illustrating an example method to operation a detector to identify a side channel attack between virtual machines that may be performed by a computing device 710, such as the computing device 600 in FIG. 6, arranged in accordance with at least some embodiments described herein.

The computing device 710 may be embodied as computing device 600, or similar devices executing instructions stored in a non-transitory computer-readable medium 720 for performing the method. A process to operate a detector to identify a side channel attack between virtual machines may include one or more operations, functions or actions as is illustrated by one or more of blocks 722, 724, 726, and/or 728.

Sonic example processes may begin with an operation 722, "MONITOR AN INTER-PROCESSOR INTERRUPT (IPI) RATE OF A FIRST VIRTUAL MACHINE (VM)." At the operation 722, the computing device 600 may identify a VM having an IPI rate higher than a predetermined IPI rate threshold as the accomplice 104.

The operation 722 may be followed by an operation 724, "MONITOR A TIME STAMP COUNTER (TSC) RATE OF A SECOND VM." At the operation 724, the computing device 600 may identify a VM having a TSC rate higher than a predetermined TSC rate threshold as the attacker 106.

The operation 724 may be followed by an operation 726, "MONITOR A CACHE MISS RATIO (CMR) OF A THIRD VM." At the operation 726, the computing device 600 may identify a VM having a CMR higher than a predetermined CMR rate threshold as the victim 108. At the operation 728, the computing device 600 may detect the side channel attack based on the IPI rate, the TSC rate, and the CMR.

Figure 8:
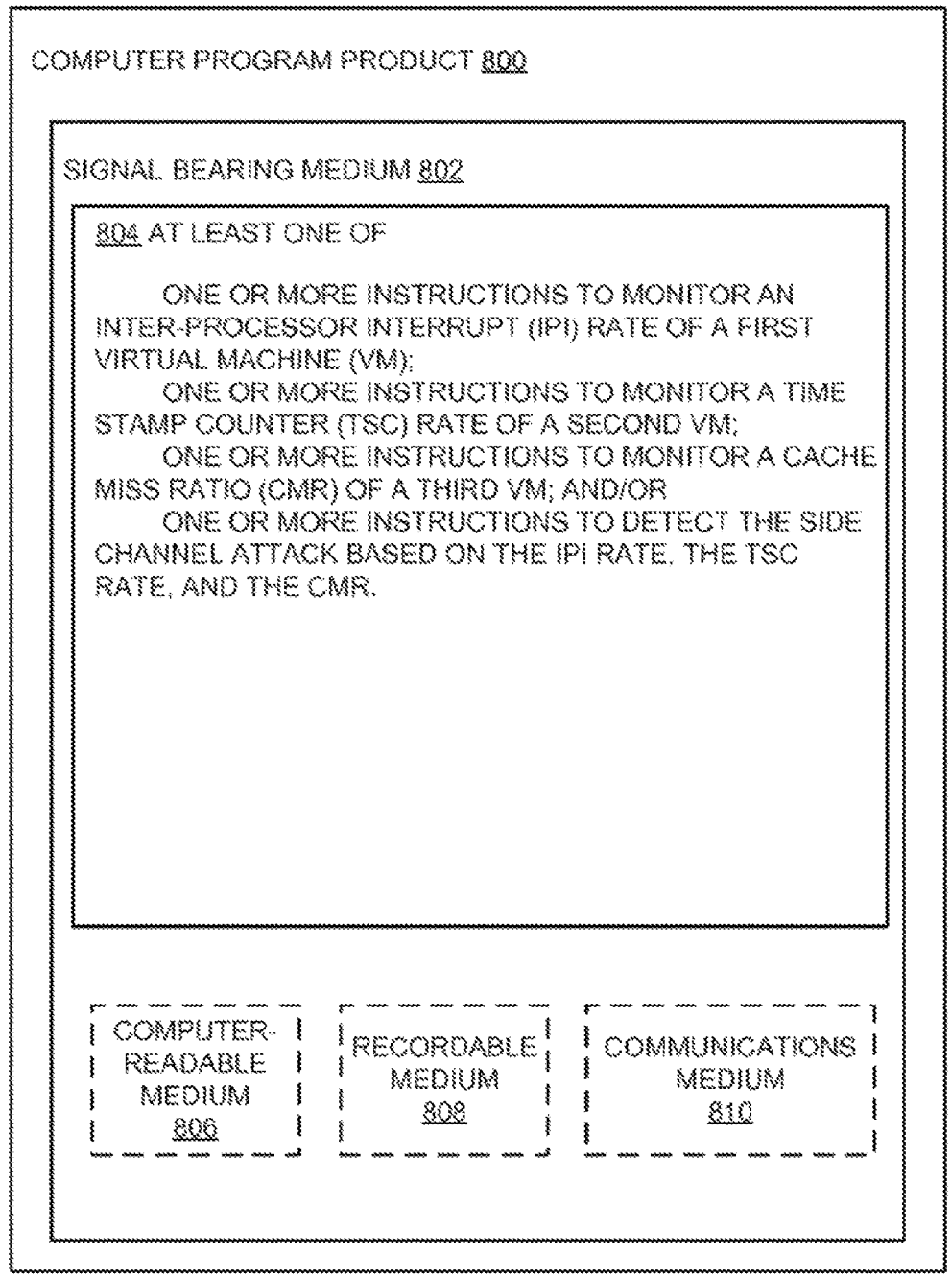
FIG. 8 illustrates a block diagram of an example computer program product to operate a detector to identify a side channel attack between virtual machines, all arranged in accordance with at least some embodiments described herein.

FIG. 8 illustrates a block diagram of an example computer program product to operate a detector to identify a side channel attack between virtual machines, arranged in accordance with at least some embodiments described herein.

In some examples as shown in FIG. 8, computer program product 800 may include a signal bearing medium 802 that may also include machine readable instructions 804 that, in response to execution by, for example, a processor, may provide the functionality described above with respect to FIG. 1 through FIG. 7. Thus, for example, referring to computing device 600, one or more of the tasks shown in FIG. 8 may be undertaken in response to instructions 804 conveyed to the computing device 600 by signal bearing medium 802 to perform actions associated with a detector to identify side channel attacks between virtual machines. Some of those instructions may include monitoring an inter-processor interrupt (IPI) rate of a first virtual machine (VM), monitoring a time stamp counter (TSC) rate of a second VM, monitoring a cache miss ratio (CMR) of a third VM, and detecting the side channel attack based on the IPI rate, the TSC rate, and the CMR.

In some implementations, signal bearing medium 802 depicted in FIG. 8 may encompass a non-transitory computer-readable medium 806, such as, but not limited to, a hard disk drive, a Compact Disc (CD), a Digital Versatile Disk (DVD), a digital tape, memory, etc. In some implementations, signal bearing medium 802 may encompass a recordable medium 808, such as, but not limited to, memory, read/write (RV) CDs, R/W DVDs, etc. In some implementations, signal bearing medium 802 may encompass a communications medium 810, such as, but not limited to, a digital and/or an analog communication medium (for example, a fiber optic cable, a waveguide, a wired communications link, a wireless communication link, etc.). Thus, for example, computer program product 800 may be conveyed to the processor 804 by an RF signal bearing medium 802, where the signal bearing medium 802 is conveyed by a wireless communications medium 810 (for example, a wireless communications medium conforming with the IEEE 802.11 standard).

According to some examples, a method is provided to detect a side channel attack between virtual machines. The method may include monitoring an inter-processor interrupt (IPI) rate of a first virtual machine (VM), monitoring a time stamp counter (TSC) rate of a second VM, monitoring a cache miss ratio (CMR) of a third VM, and detecting the side channel attack based on the IPI rate, the TSC rate, and the CMR.

According to other examples, detecting the side channel attack may include detecting the IPI rate to exceed a predetermined IPI rate threshold, and labeling the first VM as at least one from a set of: an accomplice candidate and a bystander candidate. Detecting the side channel may also include detecting the TSC rate to exceed a predetermined TSC rate threshold, and labeling the second VM as an attacker candidate. Detecting the side channel may further include detecting the CMR to exceed a predetermined CMR threshold, and labeling the third VM as a victim candidate.

According to further examples, the method may further include detecting one or more IPI sent by the first VM and received by the second VM, and determining the second VM to be interrupted by the first VM. The CMR may be determined through a first number of cache misses divided by a second number of total cache accessed by the third VM. A suspicion value associated with the side channel attack may be computed by: determining a first value based on a quotient of the IPI rate and a predetermined IPI rate threshold, determining a second value based on a quotient of the TSC rate and a predetermined TSC rate threshold, determining a third value based on a quotient of the CMR and a predetermined CMR threshold, and adding the first value, the second value, and the third value to compute the suspicion value. The suspicion value may be detected to exceed a predetermined suspicion value threshold, and the first VM and the second VM may be identified as an attacker pair. One or more datacenter operator may be allowed to adjust one or more from a set of: a predetermined IPI rate threshold, a predetermined TSC threshold, a predetermined CMR threshold, and a predetermined suspicion value threshold.

According to some examples, the method may further include clustering the IPI rate, the TSC rate, the CMR and data associated with the first VM, second VM, and third VM into an event in response to determining the side channel attack, and recording the event in a data store. One or more datacenter operator may be notified in response to determining the side channel attack.

According to other examples, a computing device may be provided to detect a side channel attack between virtual machines. The computing device may include a memory configured to store instructions, a controller coupled to the memory, where the controller executes a side channel attack detection module. The side channel attack detection module may be configured to monitor an inter-processor interrupt (IPI) rate of a first virtual machine (VM), detect the IPI rate to exceed a predetermined IPI rate threshold, label the first VM as at least one from a set of: an accomplice candidate and a bystander candidate, monitor a cache miss ratio (CMR) of a third VM, detect the CMR to exceed a predetermined CMR threshold, and label the third VM as a victim candidate.

According to some examples, the side channel attack detection module may be further configured to monitor a time stamp counter (TSC) rate of a second VM, and detecting the side channel attack based on the IPI rate, the TSC rate, and the CMR. The TSC rate may be detected to exceed a predetermined TSC rate threshold, and the second VM may be labeled as an attacker candidate. One or more IN sent by the first VM and received by the second VM may be detected, and the second VM may be determined as interrupted by the first VM. The CMR may be computed through a first number of cache misses divided by a second number of total cache accessed by the third VM.

According to further examples, the side channel attack detection module may be further configured to compute a suspicion value associated with the side channel attack through an operation to: determine a first value based on a quotient of the IPI rate and a predetermined IPI rate threshold, determine a second value based on a quotient of a TSC rate if a second VM and a predetermined TSC rate threshold, determine a third value based on a quotient of the CMR and a predetermined CMR threshold, and add the first value, the second value, and the third value to compute the suspicion value.

According to other examples, the side channel attack detection module may be further configured to compute the suspicion value for the first VM, the second VM, and the third VM, detect the suspicion value to exceed a predetermined suspicion value threshold, and identify the first VM and the second VM as an attacker pair. The IPI rate, the TSC rate, the CMR and data associated with the first VM, a second VM, and the third VM may be clustered into an event in response to determining the side channel attack, and the event may be recorded in a data store. One or more datacenter operators may be allowed to adjust one or more from a set of: the predetermined IPI rate threshold, the predetermined TSC rate threshold, the predetermined CMR threshold, and a predetermined suspicion value threshold. One or more datacenter operators may be notified in response to determining the side channel attack.

According to other examples, a computer-readable medium may be provided to detect a side channel attack between virtual machines. The instructions may cause a method to be performed in response to execution, the method being similar to the methods described above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper d, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to detect a side channel attack between virtual machines, the method comprising:
   monitoring an inter-processor interrupt (IPI) rate of a first virtual machine (VM);
   monitoring a time stamp counter (TSC) rate of a second VM;
   monitoring a cache miss ratio (CMR) of a third VM;
   detecting the side channel attack based on the IPI rate, the TSC rate, and the CMR; and
   labeling the third VM as a victim candidate in response to a detection that the CMR exceeds a predetermined CMR threshold.

2. The method of claim 1, wherein detecting the side channel attack comprises:
   detecting the IPI rate to exceed a predetermined IPI rate threshold; and
   labeling the first VM as at least one from a set of: an accomplice candidate and a bystander candidate.

3. The method of claim 1, wherein detecting the side channel attack comprises:
   detecting the TSC rate to exceed a predetermined TSC rate threshold; and
   labeling the second VM as an attacker candidate.

4. The method of claim 1, further comprising:
   detecting at least one IPI sent by the first VM and received by the second VM; and
   determining the second VM to be interrupted by the first VM.

5. The method of claim 1, further comprising:
   determining the CMR through a first number of cache misses divided by a second number of total cache accessed by the third VM.

6. The method of claim 1, further comprising:
   computing a suspicion value associated with the side channel attack by:
      determining a first value based on a quotient of the IPI rate and a predetermined IPI rate threshold;
      determining a second value based on a quotient of the TSC rate and a predetermined TSC rate threshold;
      determining a third value based on a quotient of the CMR and a predetermined CMR threshold;
      multiplying the first value, the second value, and the third value with a first coefficient, a second coefficient, and a third coefficient, respectively; and
      adding products of the first value and the first coefficient, the second value and the second coefficient, and the third value and the third coefficient to compute the suspicion value.

7. The method of claim 6, further comprising:
   detecting the suspicion value to exceed a predetermined suspicion value threshold; and
   identifying the first VM and the second VM as an attacker pair.

8. The method of claim 1, further comprising:
   clustering the IPI rate, the TSC rate, the CMR and data associated with the first VM, second VM, and third VM into an event in response to determining the side channel attack; and
   recording the event in a data store.

9. A computing device to detect a side channel attack between virtual machines, the computing device comprising:
   a memory configured to store instructions;
   a controller coupled to the memory, wherein the controller executes a side channel attack detection module, the side channel attack detection module configured to:
      monitor an inter-processor interrupt (IPI) rate of a first virtual machine (VM);
      monitor a time stamp counter (TSC) rate of a second VM;
      detect the IPI rate to exceed a predetermined IPI rate threshold;
      label the first VM as at least one from a set of: an accomplice candidate and a bystander candidate;
      monitor a cache miss ratio (CMR) of a third VM;
      detect the side channel attack based on the IPI rate, the TSC rate, and the CMR;
      detect the CMR to exceed a predetermined CMR threshold; and
      label the third VM as a victim candidate.

10. The computing device according to claim 9, wherein the side channel attack detection module is further configured to:
    detect the TSC rate to exceed a predetermined TSC rate threshold; and
    label the second VM as an attacker candidate.

11. The computing device according to claim 9, wherein the side channel attack detection module is further configured to:
    detect at least one IPI sent by the first VM and received by the second VM; and
    determine the second VM as interrupted by the first VM.

12. The computing device according to claim 9, wherein the side channel attack detection module is further configured to:
    compute the CMR through a first number of cache misses divided by a second number of total cache accessed by the third VM.

13. The computing device according to claim 9, wherein the side channel attack detection module is further configured to:
    compute a suspicion value associated with the side channel attack through an operation to:
       determine a first value based on a quotient of the IPI rate and a predetermined IPI rate threshold;
       determine a second value based on a quotient of the TSC rate and a predetermined TSC rate threshold;

determine a third value based on a quotient of the CMR and a predetermined CMR threshold;

multiply the first value, the second value, and the third value with a first coefficient, a second coefficient, and a third coefficient, respectively; and add products of the first value and the first coefficient, the second value and the second coefficient, and the third value and the third coefficient to compute the suspicion value.

14. The computing device according to claim 13, wherein the side channel attack detection module is further configured to:

compute the suspicion value for the first VM, the second VM, and the third VM;

detect the suspicion value to exceed a predetermined suspicion value threshold; and identify the first VM and the second VM as an attacker pair.

15. The computing device according to claim 13, wherein the side channel module is further configured to:

cluster the IPI rate, the TSC rate, the CMR and data associated with the first VM, the second VM, and the third VM into an event in response to determining the side channel attack; and record the event in a data store.

16. A non-transitory computer-readable storage medium with instructions stored thereon to detect a side channel attack between virtual machines, the instructions in response to execution causing a method to be performed, wherein the method comprises:

monitoring an inter-processor interrupt (IPI) rate of a first virtual machine (VM);

detecting the IPI rate to exceed a predetermined IPI rate threshold;

labeling the first VM as at least one from a set of: an accomplice candidate and a bystander candidate;

monitoring a time stamp counter (TSC) rate of a second VM;

detecting the TSC rate to exceed a predetermined TSC rate threshold;

labeling the second VM as an attacker candidate;

monitoring a cache miss ratio (CMR) of a third VM;

detecting the side channel attack based on the IPI rate, the TSC rate, and the CMR; and labeling the third VM as a victim candidate in response to a detection that the CMR exceeds a predetermined CMR threshold.

17. The non-transitory computer-readable storage medium according to claim 16, wherein at least one IPI is detected as sent by the first VM and received by the second VM and the second VM is determined as interrupted by the first VM.

18. The non-transitory computer-readable storage medium according to claim 16, wherein a suspicion value associated with the side channel attack is computed by:

multiplying a first value, a second value, and a third value with a first coefficient, a second coefficient, and a third coefficient, respectively; and adding products of the first value and the first coefficient, the second value and the second coefficient, and the third value and the third coefficient, wherein the first value is determined by dividing the IPI rate by the predetermined IPI rate threshold, the second value is determined by dividing the TSC rate by the predetermined TSC rate threshold, the third value is determined by dividing the CMR by the predetermined CMR threshold.

19. The non-transitory computer-readable storage medium according to claim 18, wherein the first VM and the second VM are identified as an attacker pair in response to a detection that the suspicion value exceeds a predetermined suspicion value threshold.

20. The non-transitory computer-readable storage medium according to claim 16, wherein the IPI rate, the TSC rate, the CMR and data associated with the first VM, second VM, and third VM are clustered into an event in response to determining the side channel attack, and the event is recorded in a data store.

* * * * *

UNITED STATES PATENT AND TRADEMARK OFFICE
CERTIFICATE OF CORRECTION

PATENT NO. : 9,438,624 B2
APPLICATION NO. : 14/384677
DATED : September 6, 2016
INVENTOR(S) : Fine It is certified that error appears in the above-identified patent and that said Letters Patent is hereby corrected as shown below:

On the Title Page

In Item (71), under "Applicant", in Column 1, Line 2, delete "Wilmington (DE)" and insert -- Wilmington, DE (US) --, therefor.

In Item (56), under "OTHER PUBLICATIONS", in Column 2, Line 2, delete "lntel" and insert -- Intel --, therefor.

In the Specification

In Column 1, Line 8, delete "§371" and insert -- § 371 --, therefor.

In Column 2, Line 58, delete "sonic" and insert -- some --, therefor.

In Column 3, Line 31, delete "take pad" and insert -- take part --, therefor.

Figure 2:
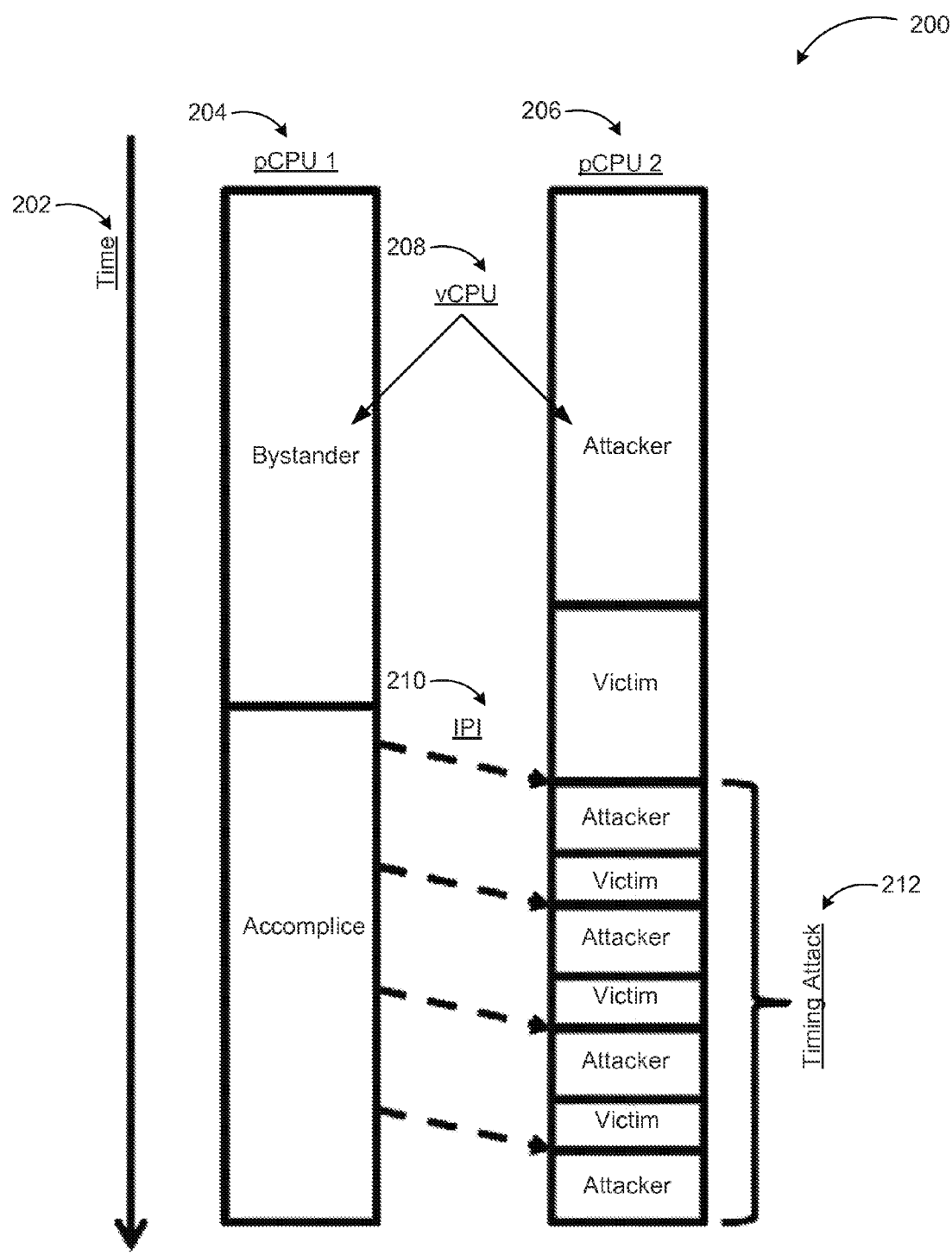
FIG. 2 illustrates an example of a side channel attack between virtual machines.

In Column 4, Line 61, delete "FTC. 2" and insert -- FIG. 2 --, therefor.

In Column 6, Line 9, delete "VM) the" and insert -- VM) receiving the --, therefor.

In Column 6, Line 17, delete "pCPU array" and insert -- pCPU may --, therefor.

In Column 6, Lines 23-24, delete "vCPU_k (GREATER" and insert -- vCPU_k GREATER --, therefor.

In Column 6, Line 40, delete "the rate" and insert -- the IPI rate --, therefor.

In Column 6, Line 41, delete "vCRU_n," and insert -- vCPU_n, --, therefor.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,438,624 B2

In Column 8, Line 12, delete "memory such" and insert -- memory (such --, therefor.

In Column 8, Line 13, delete "etc. or" and insert -- etc.) or --, therefor.

In Column 9, Line 64, delete "Sonic" and insert -- Some --, therefor.

In Column 10, Line 43, delete "(RV)" and insert -- (R/W) --, therefor.

In Column 11, Line 54, delete "IN sent" and insert -- IPI sent --, therefor.

In Column 13, Line 60, delete "that fact" and insert -- that in fact --, therefor.

In Column 15, Line 8, delete "upper d," and insert -- upper third, --, therefor.